United States Patent [19]
Schubert et al.

[11] Patent Number: 4,664,461
[45] Date of Patent: May 12, 1987

[54] ELECTRICAL CONNECTOR HAVING IN-LINE MANUFACTURED SEAL AND METHOD OF MANUFACTURE

[75] Inventors: Paul C. Schubert; Anil C. Thakrar, both of Camp Hill, Pa.

[73] Assignee: AMP Incorporated, Harrisburg, Pa.

[21] Appl. No.: 894,722

[22] Filed: Aug. 8, 1986

Related U.S. Application Data

[63] Continuation of Ser. No. 678,735, Dec. 6, 1984, abandoned.

[51] Int. Cl.$^4$ ............................................. H01B 11/00
[52] U.S. Cl. .............................. 339/59 M; 339/94 M; 29/858
[58] Field of Search ............... 339/59 R, 59 M, 94 R, 339/94 M, 218 R, 218 M; 29/858, 857, 856; 264/271.1, 272.14, 272.15

[56] References Cited

U.S. PATENT DOCUMENTS

| | | | |
|---|---|---|---|
| 2,881,479 | 4/1959 | Quackenbush | 18/59 |
| 3,221,292 | 11/1965 | Swanson et al. | 339/217 |
| 3,266,009 | 8/1966 | Jensen et al. | 339/89 |
| 3,594,696 | 7/1971 | Witek, Jr. | 339/60 |
| 3,784,952 | 1/1974 | Murray | 339/59 R |
| 3,888,559 | 6/1975 | Geib | 339/46 |
| 3,901,574 | 8/1975 | Paullus | 339/90 R |
| 3,937,545 | 2/1976 | Cairns et al. | 339/60 R |
| 3,970,352 | 7/1976 | Dorrell et al. | 339/59 M |
| 4,072,381 | 2/1978 | Burkhart et al. | 339/29 R |
| 4,500,151 | 2/1985 | Ayers | 339/94 M |

*Primary Examiner*—Gil Weidenfeld
*Assistant Examiner*—Paula A. Austin
*Attorney, Agent, or Firm*—Katherine A. Nelson

[57] ABSTRACT

Electrical connector having in-line manufactured seals and method of manufacturing such connectors. The method includes the steps of providing a connector housing defining a cavity in at least one end thereof, and forming a sealing member directly within each said cavity. According to a presently preferred embodiment, forming assemblies are mounted to the connector housing; and a low-temperature curing elastomeric material is injected into each said cavity and cured therein to form the sealing members. The forming means includes means for forming passageways through said sealing members generally aligned with passageways in said connector housing for receiving electrically conductive means therein; and the passageways in the sealing members include means for reliably sealing around the electrically conductive means. The connector housing is preferably molded of a relatively rigid plastic and includes means for retaining the sealing members locked in place within the cavities.

21 Claims, 6 Drawing Figures

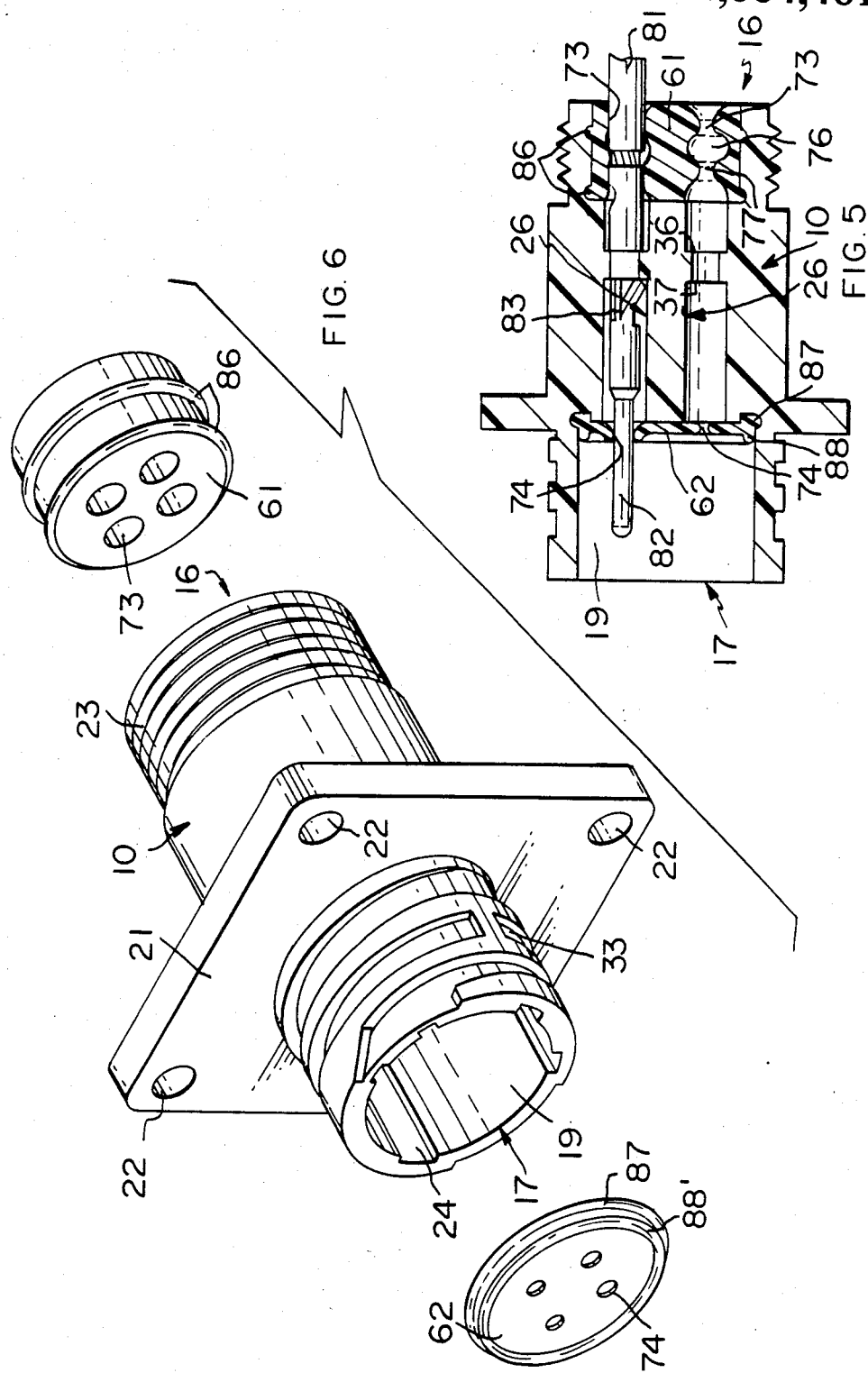

ELECTRICAL CONNECTOR HAVING IN-LINE MANUFACTURED SEAL AND METHOD OF MANUFACTURE This application is a continuation of application Ser. No. 678,735 filed Dec. 6, 1984, now abandoned.

BACKGROUND OF THE INVENTION

The present invention relates generally to the field of electrical connectors, and, more particularly, to an environmental connector having in-like manufactured seals and to a method of manufacturing such connectors.

Typically, electrical connectors are constructed from a plurality of parts which are separately fabricated and then assembled together into complete connectors. This is not a fully satisfactory procedure because the handling and assembling of the individual components tends to increase both manufacturing and labor costs. Also, because the individual parts are manufactured separately, there is an increased likelihood that certain parts will not fit together properly resulting in imperfectly-made connectors and in an excessive number of rejects.

If the connector is designed for outside use, for example, on vehicles such as recreational or off-road vehicles, it is especially important that the connector be effectively sealed to prevent moisture, dust or other contaminants from reaching the interior of the connector where they can cause corrosion or otherwise prevent proper operation of the connector. Commonly, environmental connectors are relatively complex in design so as to reliably seal the connectors both where the conductor wires enter into the connectors and where the terminal members extend from the connectors.

It is also important that the connectors be able to reliably withstand the effects of any vibration or other rough handling that they are likely to be subjected to in use.

SUMMARY OF THE INVENTION

In accordance with the present invention, an electrical connector is manufactured by a method which includes the steps of providing a connector housing having a cavity at one end thereof, and forming a sealing member within the cavity, the sealing member defining one or more passageways extending therethrough for receipt of electrically conductive means therein.

By the above method, the sealing member is formed directly within the connector housing in an in-line process during the manufacture of the connector, and this results in a connector that is lower in cost, requires less handling, and will generally be more reliably constructed than connectors in which the individual parts are fabricated separately for later assembly.

According to a presently preferred embodiment of the invention, the connector housing comprises a relatively rigid plastic material molded to the desired configuration by a conventional injection molding process. Prior to forming the sealing member, a forming assembly, which includes a plate or other closure structure for closing the cavity for defining a mold therein, as well as a structure for defining a plurality of passageways through the sealing member, is clamped or otherwise mounted to the connector housing. The passageway defining structure preferably comprises a plurality of rods of Teflon or another material mounted to the closure structure and extending through the cavity into passageways extending through the connector housing. The sealing member is then formed within the cavity around the rods to define a sealing member having passageways extending therethrough generally aligned with the passageways in the connector housing. Conductor wires having terminal members attached thereto are then inserted through the passageways in both the sealing member and the connector housing to complete the connector.

The sealing member preferably comprises a resilient elastomeric material with low temperature curing ability; and after the forming assembly is mounted in place, the elastomeric material is injected into the cavity using a syringe or other injection device, and then cured. Thereafter, the forming assembly is removed; and the conductor wires, preferably with terminal members mounted thereto, are inserted into the connector.

Each of the plurality of rods preferably includes portions having a non-uniform cross section for defining the passageways through the sealing member. The resulting variable cross section of the passageways in the sealing member yieldably receives the conductor wires therein and provides a very effective, water-tight seal thereagainst.

The housing is also preferably formed to define annular grooves or other interlocking structure around the wall of the cavity for reliably locking the sealing member in place within the cavity when it is formed therein.

According to a presently preferred embodiment of the invention, a second sealing member is simultaneously formed in the connector housing in a similar manner within a cavity provided on the opposite end of the housing to provide an effective seal around the terminal member. This second sealing member is preferably formed to define passageways that are somewhat smaller than the terminal members such that upon insertion of the terminals therethrough, the sealing member will deform outwardly around the terminals forming an effective seal therearound.

Further details of the invention will be set out hereinafter in conjunction with the detailed description of the preferred embodiment.

BRIEF DESCRIPTION OF THE DRAWINGS

FIG. 5 illustrates a conductor wire and terminal positioned with the connector of FIG. 1; and FIG. 6 is an exploded view of the electrical connector according to a presently preferred embodiment of the invention prior to insertion of the electrically conductive means therein.

DETAILED DESCRIPTION OF THE PREFERRED EMBODIMENT

Figure 1:
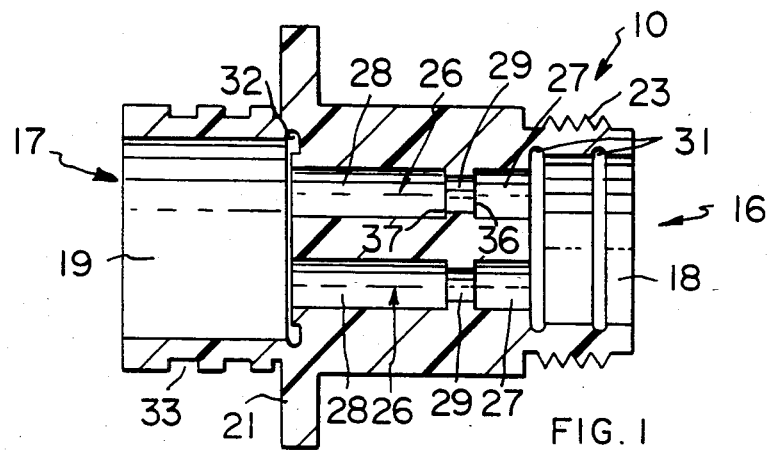
FIG. 1 is a cross-sectional view of a presently preferred embodiment of the connector housing according to the present invention.

FIG. 1 illustrates a connector housing for use in the electrical connector of the present invention. The housing is generally designated by reference numeral 10 and is preferably formed of a non-metallic material so that it will not be subject to rust and corrosion, and most preferably comprises a one-piece, plastic member formed by injection molding in a conventional manner.

Figure 2:
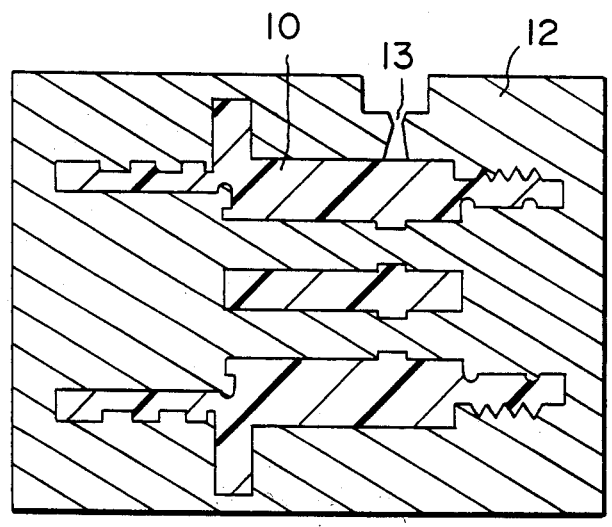
FIG. 2 is a cross-sectional view of a mold assembly for molding the connector housing of FIG. 1.

For completeness, FIG. 2 schematically illustrates a cross-sectional view of an injection mold 12 for molding connector housing 10. Although not illustrated in FIG. 2, mold 12 is, as is known in the art, formed of a plurality of components to permit the mold to be easily separated after housing 10 is formed therein.

Connector housing 10 is preferably formed of a relatively rigid plastic that will reliably retain its shape, and a number of plastic materials commonly used in the connector field would be acceptable. One particularly suitable material, however, comprises glass-reinforced and flame-retardant nylon.

In operation, the molding material is introduced into the mold 12 through one or more sprue channels 13. The mold 12 itself is preferably preheated to about 180° F. prior to introduction of the molding material. The mold material is then heated to a temperature of from about 500° F. to about 550° F. for 20 to 30 seconds. Separation of the mold components, ejection of the molded housing, and other steps in the injection molding art are then carried out in a conventional manner and need not be described herein.

With reference to FIGS. 1 and 6, connector housing 10 comprises a generally cylindrical-shaped element having opposed first and second ends 16 and 17, respectively. A first recess or cavity 18 extends into housing 10 from the first end 16, while a second, somewhat larger recess or cavity 19 extends into the housing from the second end 17. Integral with housing 10 and extending radially therefrom is a mounting flange 21 with four holes 22 cut therethrough for mounting the connector to a panel or other support (not shown). Threads 23 formed in the housing 10 could also be used for mounting purposes if desired.

A number of keyways 24 are preferably provided along the walls of recess 19 for polarizing purposes. A plurality of passageways 26 extend longitudinally through housing 10 from recess 18 to recess 19, and are provided to receive a plurality of electrically conductive means in the form of conductor wires having terminals attached thereto as will be explained more fully hereinafter. In the embodiment illustrated and described herein, housing 10 is formed with four passageways 26 of generally circular cross section for receiving four electrically conductive means. It should be understood, however, that the connector can be designed to accommodate any desired number of electrically conductive means without departing from the invention.

As shown in FIG. 1, each passageway 26 is formed to define first and second passageway portions 27 and 28 of substantially equal cross-sectional diameter separated by a portion 29 of reduced diameter defining annular shoulders 36 and 37 between passageway portions 27 and 29 and passageway portions 28 and 29, respectively.

Recess 18 is formed to define a pair of annular grooves 31 around its circumference, while recess 19 includes an annular groove 32 around its base which extends both radially and longitudinally of the recess 19. As will be explained hereinafter, grooves 31 and 32 comprise interlocking means for locking sealing members formed within cavities 18 and 19 in place within housing member 10.

Finally, threads 33 are formed on the outer surface of housing 10 around recess 19 for attaching the male illustrated connector to a corresponding female connector (not shown).

The electrical connector of the present invention is especially designed for outside use, for example, as a connector for trucks and other vehicles, and, therefore, must not only be very rugged, but also must be effectively sealed so as to prevent moisture, dust or other contaminating materials from entering into the connector, as this can damage the connector and create a fire hazard. However, it is to be understood that the present invention may be used inside in a variety of conditions, such as dust-filled environments.

In order to a seal a connector, it is known to insert separately manufactured sealing elements of various types into various locations within or around a connector; and these are generally effective to varying degrees. Because, however, these sealing elements are manufactured separately and later assembled into the connector, both manufacturing and labor costs are increased; and also, there is a greater possibility that the separately manufactured connector components will not fit together properly, resulting in a reject or an imperfect connector.

These and other deficiencies have been obviated in the present invention by manufacturing the connector by a method which includes forming highly effective sealing members directly within the connector housing in an in-line process.

Figure 3:
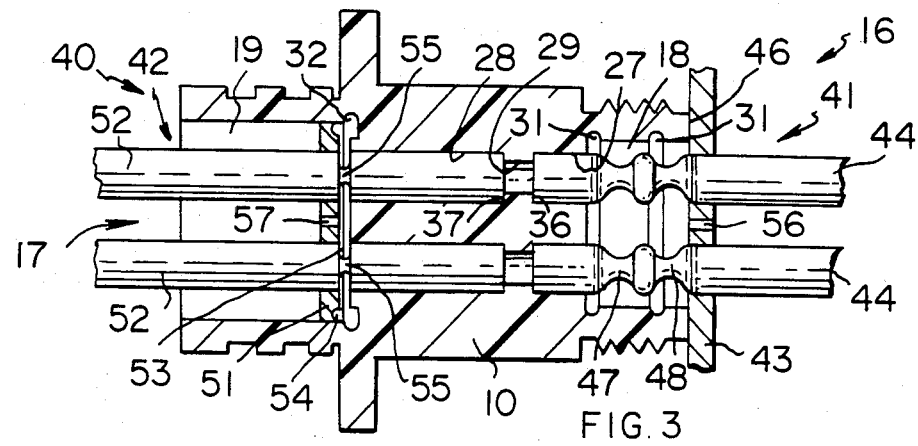
FIG. 3 is a cross-sectional view illustrating the assembly including the connector housing of FIG. 1 and forming means clamped thereto.

FIG. 3 illustrates the first step of a presently preferred method of manufacturing the sealing member, which comprises mounting a forming means to the housing 10 for defining molds within cavities 18 and 19. The forming means is generally designated by reference numeral 40 and includes a first forming assembly 41 adapted to be mounted to the first end 16 of the housing, and second forming assembly 42 adapted to be mounted to the second end 17 of the housing.

First forming assembly 41 comprises a plate 43, preferably of metal, for closing cavity 18 and having a plurality of rods 44 mounted thereto. The number and positioning of the rods correspond to the number and position of passageways 26 such that when plate 43 is pressed down against first end 16, and, in particular, against annular rim 46 defined around recess 18, the rods 44 will extend into passageway portions 27 and rest firmly against shoulders 36 formed between passageway portions 27 and passageway portions 29.

Rods 44 may be made of Teflon, stainless steel, or another appropriate material and are sized to fit tightly within passageway portions 27 so as to prevent elastomeric material injected into cavity 18 from entering into the passageways.

Rods 44 are formed to define two areas 47 and 48 of reduced diameter to define a rod portion of variable cross section. These portions of variable cross section are positioned on the rods 44 so to be located within cavity 18 when the forming assembly 41 is mounted to connector housing 10 as shown in FIG. 3.

Second forming assembly 42 also includes a plate 51 of metal or the like supporting a plurality of rods 52. Rods 52 are adapted to fit into passageway portions 28 and are sized to extend to and firmly press against annular shoulder 37 formed between passageway portions 28 and 29 when forming assembly 42 is in position.

Plate 51 is sized to just fit into recess 19 with a tight fit between the plate and the wall of the recess and is inserted into recess 19 slightly spaced from annular groove 32 to define a closed cavity 53 between the base of recess 19 and the bottom face of plate 51. As can be seen in FIG. 3, the bottom face of plate 51 includes an annular groove 54 around its periphery which helps define cavity 53.

As also illustrated in FIG. 3, rods 52 are shaped to define reduced diameter portions 55 which extend across the width of cavity 53.

Figure 4:
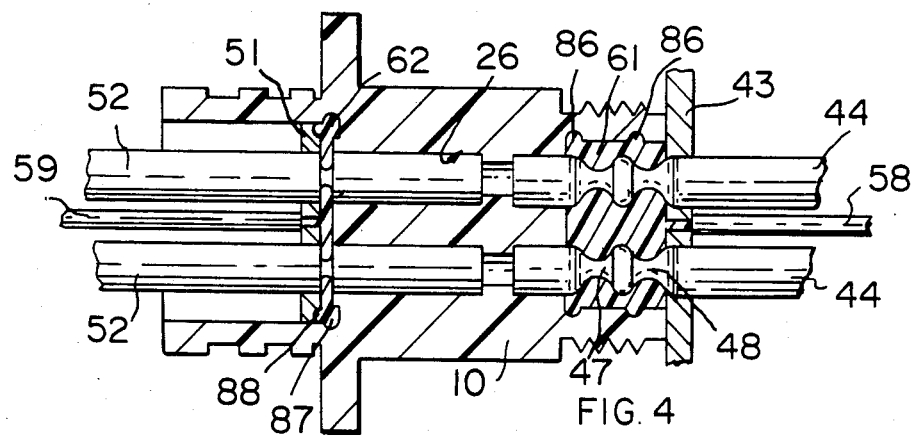
FIG. 4 illustrates the forming of the sealing member within the connector housing of FIG. 1.

After the forming assemblies 41 and 42 are firmly clamped in position, an elastomeric material is injected into cavities 18 and 53 through small openings 56 and 57 provided in plates 43 and 51, respectively. More particularly, as shown in FIG. 4, syringes 58 and 59 or other suitable injection devices are inserted into openings 56 and 57, respectively; and the cavities 18 and 53 are filled with elastomeric material which is then allowed to cure and form conductor wire sealing member 61 and terminal sealing member 62. While the elastomeric material is being injected and cured in cavities 18 and 53, the rods 52 are firmly supported by appropriate structure (not shown) to prevent any rotation or other movement of the connector housing.

Although there are a number of elastomeric materials that can be used for forming sealing members 61 and 62, a presently preferred material comprises an elastomeric material having low-temperature curing ability; and a particularly preferred material comprises: two parts of Silastic 595, Part A; three parts of Silastic 595, Part B; and 10% by weight of CF3-6559 accelerator, all produced by Dow-Corning of Midland, Mich. Curing of this material can be accomplished to 90% cure in 35 seconds at 250° F., according to the Oscillating Disk Rheometer.

The physical properties of 2:3 Silastic 595 with 10% CF3-6559 are set forth in the following table:

|  | As Molded | | 7 Day 120° F. | |
| --- | --- | --- | --- | --- |
|  | No Post Cure | Post Cure | No Post Cure | Post Cure |
| Hardness, Shore A | 38 | 48 | 47 | 46 |
| 100% Modulus, psi | 130 | 240 | 280 | 280 |
| 200% Modulus, psi | 330 | 660 | 720 | 690 |
| 300% Modulus, psi | 600 | — | — | — |
| Tensile Strength, psi | 620 | 740 | 1020 | 870 |
| Elongation, % | 305 | 215 | 265 | 240 |
| Tear Strength, ppi | 67 | 49 | 50 | 51 |
| Compression Set, % | 62.9 | 3.3 | 0.6 | 2.6 |

These properties were determined on slabs which were produced in a slab mold in a Boy press using 35 seconds cure at 250° F. The material hardens with post curing, increasing by about 10 pts. Post curing also increases the tensile properties while decreasing the elongation and tear properties. Compression set is reduced significantly by post curing. The post cure cycle used was 16 hours at 125° C.

By using a fast, low-temperature curing material for the sealing members (e.g., low-temperature curing is normally considered as being between about 250°–300° F.), damage to the plastic housing 10 is avoided while still obtaining a highly effective seal.

After curing, both conductor wire sealing member 61 and terminal sealing member 62 will be firmly locked in place within housing 10 in interlocking engagement with the walls of cavities 18 and 19, respectively. More particularly, sealing member 61 will be formed with annular ridges 86 extending into annular grooves 31 in the wall of cavity 18 to lock sealing member 61 in position; while sealing member 62 will be formed with annular ridges 87 and 88 extending into annular grooves 32 and 54 in the wall of cavity 19 and in plate 51, respectively, for locking sealing member 62 firmly in position, as best seen in FIGS. 3 and 4.

Following curing and post curing of sealing members 61 and 62, forming assemblies 41 and 42 are removed from the connector housing 10. As shown in FIG. 5, removal of first forming assembly 41 provides a plurality of passageways 73 extending through conductor wire sealing member 61; and removal of second forming assembly 42 results in a plurality of passageways 74 extending through terminal sealing member 62. Because of the configuration of rods 44, passageways 73 will have a variable cross-sectional shape which includes portion 76 of relatively wide cross section and portions 77 of relatively narrow cross section. Similarly, because of the configuration of rods 52, and, in particular, because of portions 55 thereon of reduced cross-section, passageways 74 are of relatively small cross section and, in fact, are smaller than the size of the terminal means that are to be extended therethrough.

Upon removal of forming assemblies, conductive means comprising conductor wires 81 and terminals 82 are inserted into the connector. Preferably, each conductor wire is first crimped around or otherwise secured to the end of a terminal member, and the conductor wire/terminal assemblies are then inserted into the connector from end 16 and pushed through passageways 73, 26 and 74 until terminal member 82 is fully extended into cavity 19 as shown in FIG. 5. Terminal members 82 each are formed with a plurality of spring fingers 83 on their back end. When the terminal members have been fully inserted such that the terminal members will fully clear shoulder 37 in passageway 26, the spring fingers 83 will spring open to prevent rearward movement of the terminal members. Similarly, the conductor wires 81 will engage shoulder 36 to prevent further forward movement of the conductor wires. Thus, the terminal members and attached conductor wires will be effectively locked in place within the connector.

Sealing members 61 and 62 will very effectively seal the connector and present moisture, dust or other debris from entering into the connector. More particularly, the conductor wires 81 are of a greater diameter than the diameter of portions 77 of reduced cross-section of passageways 73 of conductor sealing member 61. Accordingly, when the conductor wires 81 are inserted into the passageways 73, the walls of the passageways will be deformed and compress the elastomeric material of the sealing member 61 which then hold the conductors in a tight grip as shown in FIG. 5 positively preventing fluid from entering into the connector around the conductor wires.

In addition, when terminal members 82 are pushed through passageways 74 in terminal sealing member 62, they will deform the peripheries of the smaller diameter passageways 74 outwardly causing the sealing member 62 to firmly grip and seal the connector around the terminal members.

Thus, with the present invention, an electrical connector is provided which will effectively seal the interior of the connector against the entrance of moisture or other damaging materials. In addition, the connector is manufactured by a method whereby the sealing members are formed in place in the connector in an in-line process rather than being manufactured separately and later assembled. This ensures that the seals will fit properly and reduces the cost of manufacturing the connector.

While what has been described constitutes a presently most preferred embodiment, it should be understood that the invention can take other forms. For example, while what has been described constitutes a male connector and its method of manufacture, the invention also applies to female connectors having female terminal members and their method of manufacture; and the term "terminal member" as used herein is intended to include both male and female terminal members. Because those skilled in the art are likely to devise numerous variations and modifications which do not depart from the true scope of the invention, all such variations and modifications are intended to be covered by the appended claims.

We claim:

1. A method of manufacturing an electrical connector comprising:

providing a connector housing, said connector housing including means for defining a cavity at one end thereof, and a plurality of passageways extending therethrough from said one end to the opposite end thereof;

positioning a forming assembly to substantially close at least a portion of said cavity, said forming assembly including a structure for substantially blocking said passageways in said connector housing means;

forming a sealing member within said substantially closed cavity, said sealing member defining a plurality of passageways extending therethrough positioned to be generally aligned with said plurality of passageways in said connector housing;

removing said forming assembly; and positioning electrically conductive means within said plurality of passageways.

2. The method recited in claim 1 wherein said forming assembly positioning step includes extending a plurality of rods into said plurality of passageways in said connector housing for substantially closing said passageways in said connector housing, said rods further including means for defining said plurality of passageways in said sealing member.

3. The method of claim 1 wherein said connector housing further includes means for defining a second cavity at said opposite end thereof; and wherein said method further includes positioning a forming assembly to substantially close at least a portion of said second cavity; and forming a second sealing member within said substantially closed second cavity, said second sealing member defining a plurality of passageways for receipt of said electrically conductive means therethrough.

4. The method recited in claim 1 wherein said forming step includes:

injecting an elastomeric material into said substantially closed cavity; and curing said elastomeric material within said substantially closed cavity to form an elastomeric sealing member within said cavity.

5. The method recited in claim 4 wherein said curing step comprises curing said elastomeric material at a relatively low temperature of about 250°–300° F.

6. The method recited in claim 5 wherein said injecting step comprises injecting two parts Silastic 595 Part A, 3 parts Silastic 595 Part B, and an accelerator.

7. An electrical connector comprising:

a housing, said housing including means for defining a cavity at one end thereof and a plurality of passageways extending therethrough from said one end to the opposite end thereof;

a sealing member formed in place within said cavity, said sealing member including a plurality of passageways extending therethrough for subsequent receipt of electrically conductive means, said sealing member passageways being generally aligned with said passageways in said housing; and electrically conductive means positioned within said plurality of passageways in said housing and said sealing member, said sealing member sealing around said electrically conductive means.

8. The connector of claim 7 wherein said sealing member comprises an elastomeric sealing member cured within said cavity.

9. The connector of claim 8 and further including interlocking means on the wall of said cavity, said elastomeric sealing member being formed around said interlocking means for retaining said sealing member in said cavity.

10. An electrical connector comprising:

a connector housing, said connector housing having first and second opposed ends;

means for defining first and second cavities in said first and second ends, respectively;

a plurality of passageways extending through said housing from said first end to said second end;

first and second elastomeric sealing members cured in place within said first and second cavities, respectively, said first and second sealing members each including a plurality of passageways extending therethrough generally aligned with the passageways in said connector housing;

interlocking means on the walls of said first and second cavities for retaining said first and second sealing members in said first and second cavaties, respectively; and terminal members having conductor wires attached thereto positioned within each of said plurality of passageways in said connector housing and said first and second sealing members, said first sealing member sealing around said conductor wires and said second sealing member sealing around said terminal members.

11. The connector of claim 10 wherein said elastomeric sealing members comprise an elastomeric material with low-temperature curing ability.

12. A method for making an electrical connector having a connector housing formed with at least one end cavity and a plurality of passageways extending through said housing for subsequently receiving electrically conductive means therein, said method including the steps of:

positioning means for substantially closing the at least one end cavity to form a mold for receiving elastomeric sealing material for forming a sealing member within the cavity, and for defining passageways for receipt for electrically conductive means in said sealing member; and injecting sealing material into said mold in the substantially closed cavity, to define the sealing member having passageways therein, said sealing member passageways being aligned with said housing passageways.

13. The method of making an electrical connector as described in claim 12 wherein said at least one end cavity is substantially closed by a forming assembly, said assembly including means for substantially blocking said passageways in said connector housing.

14. The method of making an electrical connector as described in claim 12 wherein said electrically conductive means includes conductor wires and terminal members, and wherein said method further includes the steps of:

positioning said electrically conductive means within said housing and sealing member passageways.

15. The method of making an electrical connector as described in claim 12 wherein said connector housing includes a second cavity at a second end of the housing and wherein said method further includes the steps of:

positioning second means for substantially closing the second end cavity to form a mold for receiving sealing material for forming a sealing member within the second end cavity and for defining passageways for receipt of electrically conductive means in said second end sealing member; and injecting sealing material into said second end mold to define a second end sealing member having passageways therein, said second end sealing member passageways being aligned with said housing passageways.

16. The method of making an electrical connector as described in claim 15 wherein said first and second end sealing members are formed simultaneously.

17. The method of making an electrical connector as described in claim 15 wherein said electrically conductive means includes conductor wires and terminal members, and wherein said method further includes the step of positioning said electrically conductive means within said housing and sealing member passageways.

18. An electrical connector comprising:

a housing, said housing including means for defining a cavity at one end thereof and a plurality of first passageways extending therethrough from said one end to the opposite end thereof; and a sealing member formed in place within said cavity, said sealing member including a plurality of second passageways extending therethrough in alignment with said first passageways for subsequent receipt and sealing engagement with electrically conductive means.

19. The electrical connector as described in claim 18 further including:

means for defining a cavity at a second end thereof, a second sealing member formed in place within said second cavity, said second sealing member having a plurality of third passageways extending therethrough in alignment with said first and second passageways for subsequent receipt and sealing engagement with said electrically conductive means.

20. An electrical connector as described in claim 18 further including electrical conductor means disposed in said aligned first and second passageways.

21. An electrical connector as described in claim 20 further including electrical conductor means disposed in said aligned first and second passageways.

* * * * *